No. 822,602. PATENTED JUNE 5, 1906.
A. GROSS & A. C. HORN.
METHOD OF WATERPROOFING BUILDINGS, &c.
APPLICATION FILED DEC. 1, 1903.

Witnesses:
Herman M. Schaaf.
B. C. Stickney.

Inventors.
August Gross.
Aaron Charles Horn.
By their Attorney.
Thos. L. Patterson.

UNITED STATES PATENT OFFICE.

AUGUST GROSS AND AARON C. HORN, OF NEW YORK, N. Y.; SAID GROSS ASSIGNOR TO SAID HORN.

METHOD OF WATERPROOFING BUILDINGS, &c.

No. 822,602.  Specification of Letters Patent.  Patented June 5, 1906.

Application filed December 1, 1903. Serial No. 183,423.

*To all whom it may concern:*

Be it known that we, AUGUST GROSS and AARON CHARLES HORN, citizens of the United States, residing in Manhattan borough, city of New York, in the county of New York and State of New York, have invented a certain new and useful Method of Waterproofing Buildings, &c., of which the following is a specification.

This invention relates to an improved method for waterproofing or damp-proofing floors, walls, roofs, &c., of buildings, tunnels, &c.; and its object is to reduce the cost and improve the quality and durability of the waterproofing.

Figure 1:
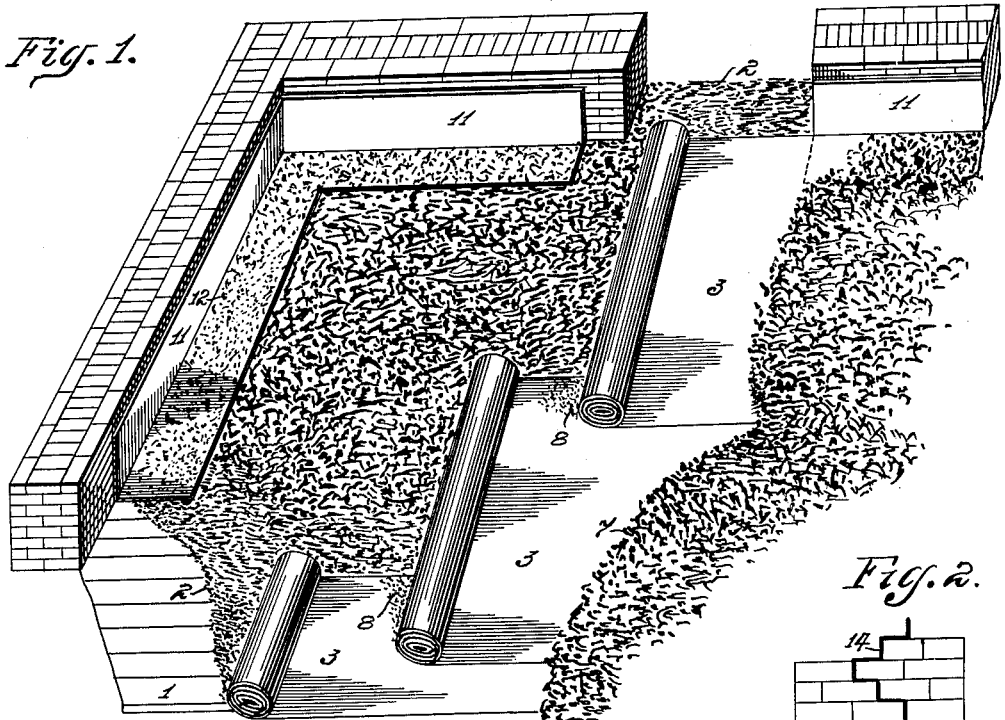
Figure 2:
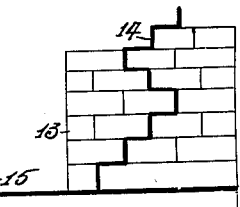
Figure 3:
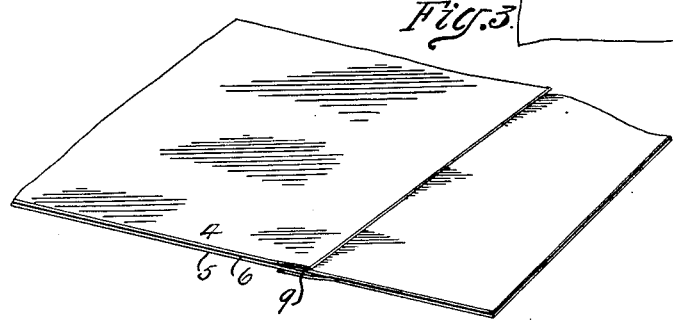
Figure 4:

In the accompanying drawings, Figure 1 is a perspective view illustrating one method of waterproofing the floor of a hospital, stable, or other building. Fig. 2 is a diagram illustrating how our novel damp-proofing course may be carried interiorly of a wall during the erection thereof. Fig. 3 illustrates one method, and Fig. 4 another method, of overlapping sheets used in waterproofing.

In the several views like signs denote like parts.

In carrying out our invention there is applied to the floor 1 a coating 2, consisting of a compound of asphalt, oil, and cement. This is covered with sheeting or sheets 3 of waterproofing quality, each sheet preferably consisting of plies 4 and 5, of fabric, united by a compound 6 of asphalt and oil. After the floor is covered with the sheeting a coating 7, of asphalt, oil, and cement, is applied, and then the top flooring is laid, which may consist of boards or cement.

The compound employed for the coats 2 and 7 preferably consists of asphalt or asphaltum mixed with sufficient pine-oil to render the compound liquid and also with sufficient linseed-oil to flux the asphalt and the pine-oil, Portland cement being added to render the compound better adapted for its purpose. In producing this compound asphaltum of a high grade may be refined, the heat required being about 400°. It becomes a thick liquid, into which linseed-oil is slowly poured. Then pine-oil is added, and the compound is stirred until it is thoroughly mixed. The pine-oil is a non-drying oil, and the compound remains liquid for a long time and may be applied cold to the floor. Portland cement is usually added shortly before the compound is to be applied to a floor, wall, or roof. The compound is not only damp-proof, but also acts as a filler for crevices or holes in the wall or floor. It is recommended that the pine-oil and linseed-oil be in about equal proportions and form about one-fourth, by weight, of the componud and also that the asphalt and Portland cement be in about equal proportions, by weight, the quantity of cement being preferably less than that of asphalt. In practice five hundred pounds of asphaltum and four hundred and seventy-five pounds of Portland cement are compounded with one hundred and twenty pounds each of linseed-oil and pine-oil. The addition of other ingredients may be resorted to.

The compound is applied cold by a brush or other means, and the sheeting readily adheres thereto. Heretofore where tar has been employed for like purposes it has been necessary to heat the tar, which required skilled labor and was otherwise expensive and tedious, while the present method may be carried out by unskilled labor and rapidly.

The compound 6 used in the sheeting is similar to that already described, but preferably without the cement. This sheeting is waterproof and plastic and can therefore adapt itself to corners and irregular surfaces without danger of breaking or tearing. It may be applied cold by unskilled labor.

Upon the coating 7 may be applied, if desired, another layer of sheeting topped by another coating of the compound.

It will be seen that by this method each ply 4 or 5 of the fabric becomes faced upon each side with a compound of asphalt and oil, thus making a thin reliable waterproof course that is not liable to chip or crack or otherwise deteriorate.

Other bituminous material may be used as a base. Other oils may be used, such as fish-oil or paraffin. Plaster-of-paris or other cement may in some instances be used in place of Portland cement, although the latter is preferred.

The sheets 3 may be overlapped in several ways. One way is illustrated in Fig. 1, in which the edge of one sheet overlies the edge of the next, the two sheets being united by an application 8 of the asphalt compound, preferably that containing the cement. Another way of overlapping is illustrated at Fig. 3, in which the edge of each sheet is split, or, rather, the plies are separated, and the edges are then meshed together, as at 9. At Fig. 4, which is the preferred method, the edge of one sheet is opened and the unopened edge of the other sheet is inserted, as at 10. After the sheets are laid the overlapping portions are preferably subjected to pressure and heat, as by means of a hot roller, thereby firmly uniting the sheets.

In proofing a floor the first step is to apply the compound of asphalt, oil, and cement to the border of the floor and to the lower portion of the contiguous wall and to apply upon said compound a strip or flashing 11 of the sheeting already described, so as to cover the joint between the floor and wall, a single strip lying partly upon the floor and partly against the wall, as at Fig. 1. Upon this strip is then applied a coating of the compound, as at 12, which is also then applied to the main portion of the floor. The sheeting 3 is then applied over the floor and over the portions of the strip lying upon the floor. By this means the joint between the floor and the wall is sealed and the liability of a crack occuring in the course at said joint is avoided.

At Fig. 2 is illustrated diagrammatically a wall 13, into which is built a waterproofing course 14, which course may comprise coatings of compound with an intermediate layer of the described sheeting and may extend in zigzag form, as illustrated. The course may be formed cold and the bricks may be cold, and owing to the plastic nature of both the sheeting and the compound there is no liability of a break occurring at the corners in the course, while the course adapts itself nicely to the bricks and tends to strengthen rather than weaken the wall. The course is seen extended at 15 to cover the floor.

The application of the waterproofing compound to the boards of the roof or wall or floor fills up all cracks, joints, and pores, and this gives protection against water leaking through the roof in the event that through accident or injury to the superposed layers water should come into contact with the roof. This compound adheres strongly to the roof, wall, or floor. When the roof or the like contracts or expands or settles or warps, the said compound, which remains permanently plastic, does not bend in such a manner as to crack and does not separate from the roof or wall or floor, but accommodates all changes therein without losing its characteristics or quality. The fabric which is used in the proofing has similar qualities of plasticity or pliability and unbreakableness, and all of the layers of material and fabric taken together form a single permanently-plastic roofing or covering which cannot be separated under ordinary circumstances from the wall or the like which it protects, nor can it break and let the dampness in, either at the exposed corners or elsewhere, nor will the enormous pressure to which the proofing layers are subjected in underground work, as in many-storied subcellars or in subaqueous tunnels, have a deleterious effect upon the proofing, which under all conditions now known retains permanently its plastic and damp-proof qualities. The brittleness, which has heretofore proved a source of trouble for these purposes, is wholly avoided. The first layer of compound adheres tenaciously to the wall or the like, and the sheeting adheres likewise to said layer, and as each successive layer of sheeting and compound is applied the whole becomes a thick plastic sheet which is thoroughly adhesive to the wall, roof, or floor, and as the whole remains in a flexible and plastic state it will expand and contract in conformity with the expansion and contraction of the roof or the like. By means of the interlapping edges a continuous proofing or plastic sheet is formed without the use of nails, and hence adapted to stone walls, concrete foundations, and the like.

Having thus described our invention, we claim—

1. A method of waterproofing flooring, comprising applying a compound of asphalt and oil to the border of the floor and to the lower portion of the contiguous wall, applying upon said compound a strip or flashing so as to cover the joint between the floor and the wall, applying said compound to said strip or flashing and to the main portion of the floor, applying a sheeting to cover the floor and the portion of said strip which lies upon the floor, and then applying a coating of said compound.

2. A method of waterproofing flooring, comprising applying a compound of asphalt, oil and cement to the border of the floor and to the lower portion of the contiguous wall, applying upon said compound a strip or flashing so as to cover the joint between the floor and the wall, applying said compound upon said strip or flashing and also upon the main portion of the floor, applying a sheeting to cover the floor and the portion of said strip which lies upon the floor, and then applying a coating of said compound; said strip and said sheeting comprising plies of fabric united by a compound of asphalt and oil.

AUGUST GROSS.
AARON C. HORN.

Witnesses:
HERMAN M. SCHAAP,
WM. P. SCHOEN.